(12) United States Patent
Uchiyama et al.

(10) Patent No.: US 7,472,241 B2
(45) Date of Patent: Dec. 30, 2008

(54) STORAGE SYSTEM AND BACKUP METHOD

(75) Inventors: Takashi Uchiyama, Ooiso (JP); Masaki Aizawa, Odawara (JP); Fumio Yamaguchi, Minamiashigara (JP

(73) Assignee: Hitachi, Ltd., Tokyo (JP)

( * ) Notice: Subject to any disclaimer, the term of this patent is extended or adjusted under 35 U.S.C. 154(b) by 217 days.

(21) Appl. No.: 11/166,082

(22) Filed: Jun. 27, 2005

(65) Prior Publication Data

US 2006/0248295 A1   Nov. 2, 2006

(30) Foreign Application Priority Data

Apr. 27, 2005   (JP) .............................. 2005-130238

(51) Int. Cl.
*G06F 12/16* (2006.01)

(52) U.S. Cl. ...................... 711/162; 707/204; 709/214

(58) Field of Classification Search ................... 711/162
See application file for complete search history.

(56) References Cited

U.S. PATENT DOCUMENTS 7,188,222 B2 *   3/2007   Micka et al. ................ 711/162
2003/0051111 A1 *   3/2003   Nakano et al. ............... 711/162

FOREIGN PATENT DOCUMENTS

JP   2004-206562   7/2004
JP   2005-25683    1/2005

* cited by examiner

*Primary Examiner*—Gary J Portka
(74) *Attorney, Agent, or Firm*—Antonelli, Terry, Stout & Kraus, LLP.

(57) ABSTRACT

A storage system and a backup method achieving enhanced reliability without degradation in the performance of the entire system. A first storage apparatus stores data transmitted from a host system and transmits it to a second storage apparatus and a third storage apparatus. The second storage apparatus and the third storage apparatus store the data transmitted from the first storage apparatus and verify the consistency in the data between themselves.

20 Claims, 9 Drawing Sheets

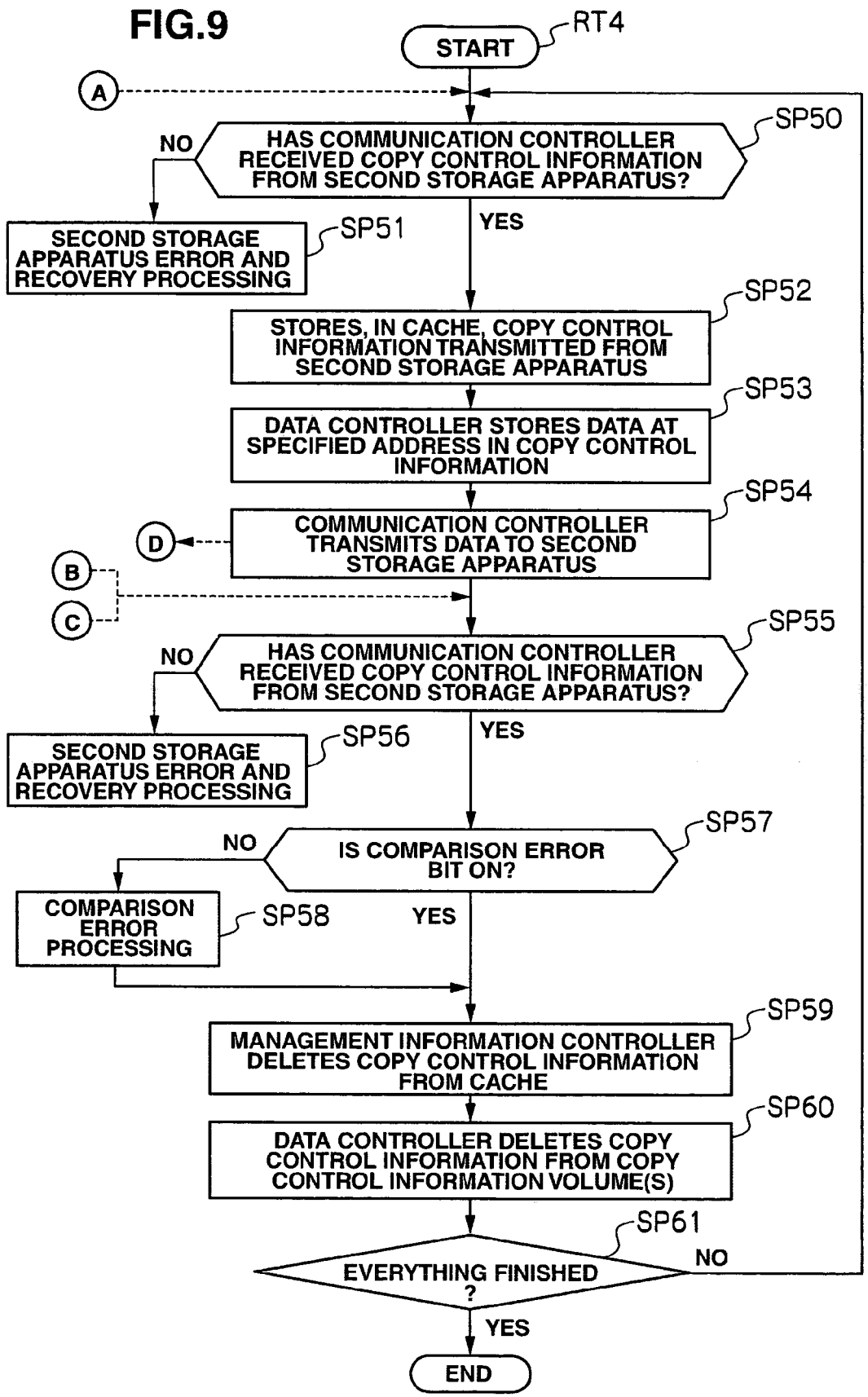

STORAGE SYSTEM AND BACKUP METHOD

CROSS-REFERENCE TO RELATED APPLICATION

This application relates to and claims priority from Japanese Patent Application No. 2005-130238, filed on Apr. 27, 2005, the entire disclosure of which is incorporated herein by reference.

BACKGROUND OF THE INVENTION

1. Field of the Invention

The present invention relates to a storage system and a backup method therefor, and it can be preferably applied to, for example, a 3 data center (3DC) system.

2. Description of the Related Art

There is a technique conventionally known as a disaster solution (disaster recovery) for a storage system, by which backup data for data in a storage apparatus operated at a certain site is managed at a different storage apparatus located away from that site (this technique is hereinafter called the "remote copy"), and various related techniques have been suggested (Japanese Patent Laid-Open Publication No. 2005-25683).

For example, Japanese Patent Laid-Open Publication No. 2005-25683 discloses a technique where backup data for data stored in a first storage apparatus is stored in a second storage apparatus, and the backup data is immediately read from the second storage apparatus and compared with the data in the first storage apparatus in order to guarantee data and enhance reliability.

Moreover, recently, many techniques have been suggested regarding a storage system called 3DC, where data stored in an operating first storage apparatus is managed at two other storage apparatuses, a second storage apparatus and a third storage apparatus, located away from each other as well as the first storage apparatus (Japanese Patent Laid-Open Publication No. 2004-206562).

For example, Japanese Patent Laid-Open Publication No. 2004-206562 discloses a technique where, among three storage apparatuses respectively located at three sites, backup data for data stored in a first storage apparatus, which is set as a copy source, is also managed at second and third storage apparatuses which are set as copy destinations, and if a failover execution request is transmitted from a host computer, a copy of the data stored in the first storage apparatus is managed by one of the second storage apparatus or the third storage apparatus, which is set as a spare.

SUMMARY OF THE INVENTION

Incidentally, according to the method suggested in Japanese Patent Laid-Open Publication No. 2005-25683, because data accumulated in the main first storage apparatus and the backup data accumulated in the backup second storage apparatus are compared at the first storage apparatus side, enormous loads are placed on the first storage apparatus.

Accordingly, the more the data-guarantee processing load increases on the first storage apparatus, the more frequently troubles occur, such as delays in processing access from a user to the first storage apparatus, thereby degrading the performance of the entire storage system.

The present invention was made considering the above points and it aims to suggest a storage system and a backup method having enhanced reliability without degradation in the performance of the entire system.

In order to achieve the above object, the present invention provides a storage system having: a first storage apparatus located at a first site; a second storage apparatus located at a second site; a third storage apparatus located at a third site; and a network connecting the first, second, and third storage apparatuses to one another in a communication-enabling manner. In this storage system, the first storage apparatus stores data transmitted from a host system and transmits it to the second and the third storage apparatuses; and the second and the third storage apparatuses individually store the data transmitted from the first storage apparatus and verify the consistency in the data between themselves.

Accordingly, in this storage system, consistency in backup data can be verified without placing excess loads on the main first storage apparatus.

Moreover, the present invention provides a backup method for a storage system having: a first storage apparatus located at a first site; a second storage apparatus located at a second site; and a third storage apparatus located at a third site. This method includes: a first step in which the first storage apparatus stores data transmitted from a host system and transmits the data to the second storage apparatus and the third storage apparatus; and a second step in which the second storage apparatus and the third storage apparatus store, individually, the data transmitted from the first storage apparatus and verify the consistency in the data by themselves.

By this backup method, consistency in backup data can be verified without placing excess loads on the main first storage apparatus.

Accordingly, the present invention can realize a storage system and backup method having enhanced reliability without degradation in the performance of the entire system because backup data consistency can be verified without placing excess loads on the main storage apparatus.

BRIEF DESCRIPTION OF THE DRAWINGS

FIG. 9 is a flow chart indicating a subordinate side check processing routine.

DETAILED DESCRIPTION OF THE INVENTION

An embodiment of the present invention will be hereinafter explained in detail with reference to the drawings.

1. Structure of the Storage System According to the Present Embodiment.

Figure 1:
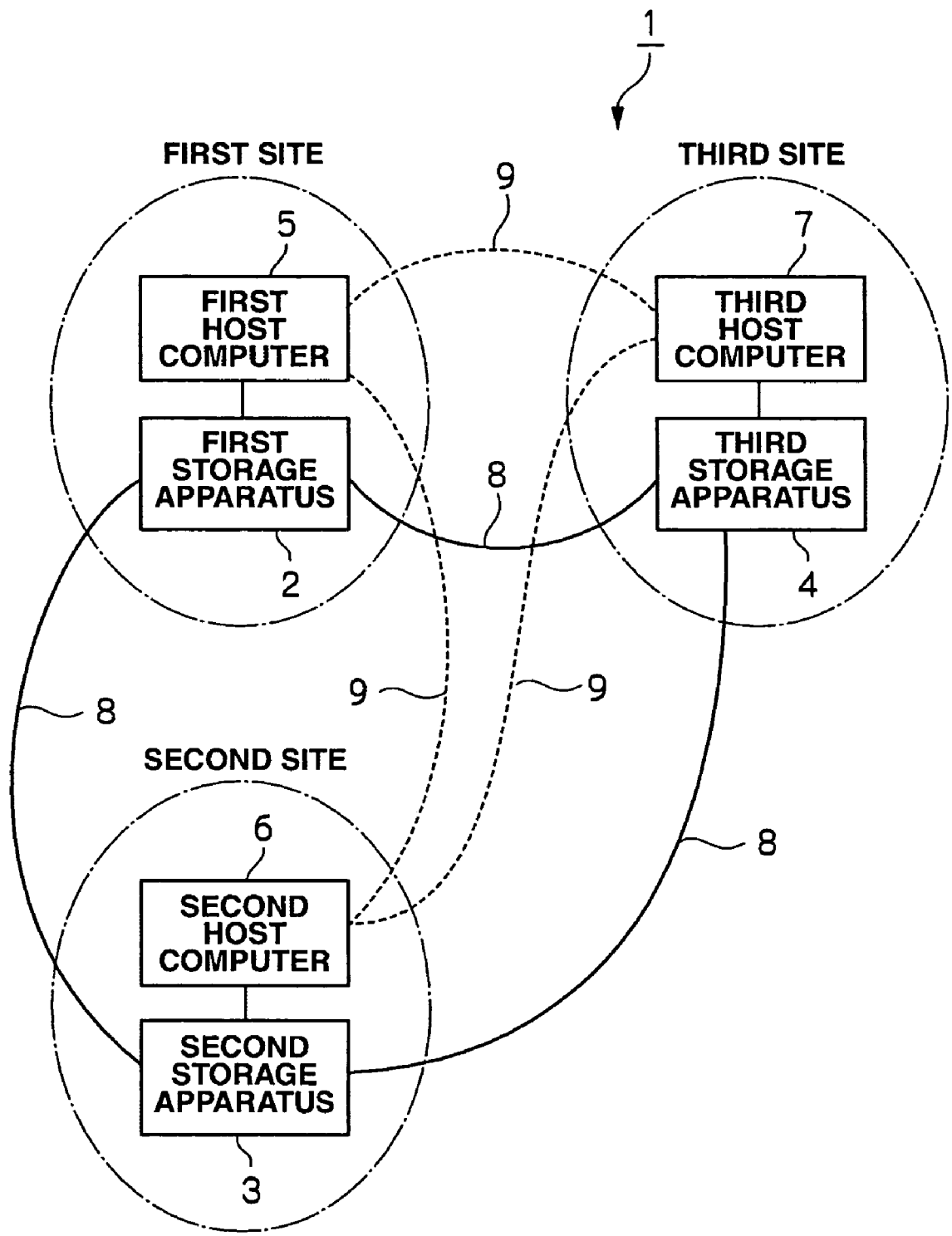
FIG. 1 is a block diagram showing a structure of a storage system according to an embodiment of the present invention.

FIG. 1 shows a storage system 1 according to the present embodiment. The storage system 1 is composed of: a plurality of storage apparatuses 2 to 4 located at three different sites; and host computers 5 to 7 respectively connected to the storage apparatuses 2 to 4. Each site refers to, for example, a computer facility administrated by an organization such as a university or a company, or a data center for operating a Web server on the Internet or an Application Service Provider (ASP). This storage system 1 is structured in order to realize disaster recovery in case of earthquake, fire, typhoon, flood, lightning strike, or terrorism.

Regarding these three sites, a first host computer 5, which is a host system, and a first storage apparatus 2 that the first host computer 5 accesses are located at a first site; a second host computer 6 and a second storage apparatus 3 that the second host computer 6 accesses are located at a second site; and a third host computer 7 and a third storage apparatus 4 that the third host computer 7 accesses are located at a third site.

A host computer and a storage apparatus located at one of the first, second, or third sites are used as main elements and host computers and storage apparatuses located at the other two sites are used as backup elements. In the following description, the first host computer 1 and the first storage apparatus 2 located at the first site are used as main elements, and the second and third host computers 6 and 7 and the second and third storage apparatuses 3 and 4 located at the second and third sites are used as backup elements.

The first, second, and third host computers 5, 6, and 7 respectively located at the first, second, and third sites are connected to each other via a network 9 in a communication-enabling manner. This network 9 is, for example, a wide area network (WAN) specifically configured with an IP network or the like.

The first, second, and third storage apparatuses 2, 3, and 4 located at the first, second, and third sites are also connected to each other via a network 8 in an communication-enabling maner. In this case, a high-speed large-volume network such as a Gigabit Ethernet (registered trademark), Asynchronous Transfer Mode (ATM), or a public line is used for the network 8 to transmit copy data in a remote copy, which will be described later.

2. Device Structure

Each of the first, second, and third host computers 5, 6, and 7 is a computer device having information processing resources such as a central processing unit (CPU) and memory, and is composed of a personal computer, a workstation, a mainframe, or similar. An operating system is operated on each of the first, second, and third host computers 5, 6, and 7 and various application software is operated on the operating system.

The first, second, and third host computers 5, 6, and 7 are connected to the first, second, and third storage apparatuses 2, 3, and 4 via a network or a cable, such as a storage area network (SAN), local area network (LAN), the Internet, a public line, or a dedicated line. Communication between the first, second, and third host computers 5, 6, and 7 and the first, second, and third storage apparatuses 2, 3, and 4 is conducted according to Fibre Channel Protocol if the network is a SAN, or Transmission Control Protocol/Internet Protocol (TCP/IP) if the network is a LAN.

Figure 2:
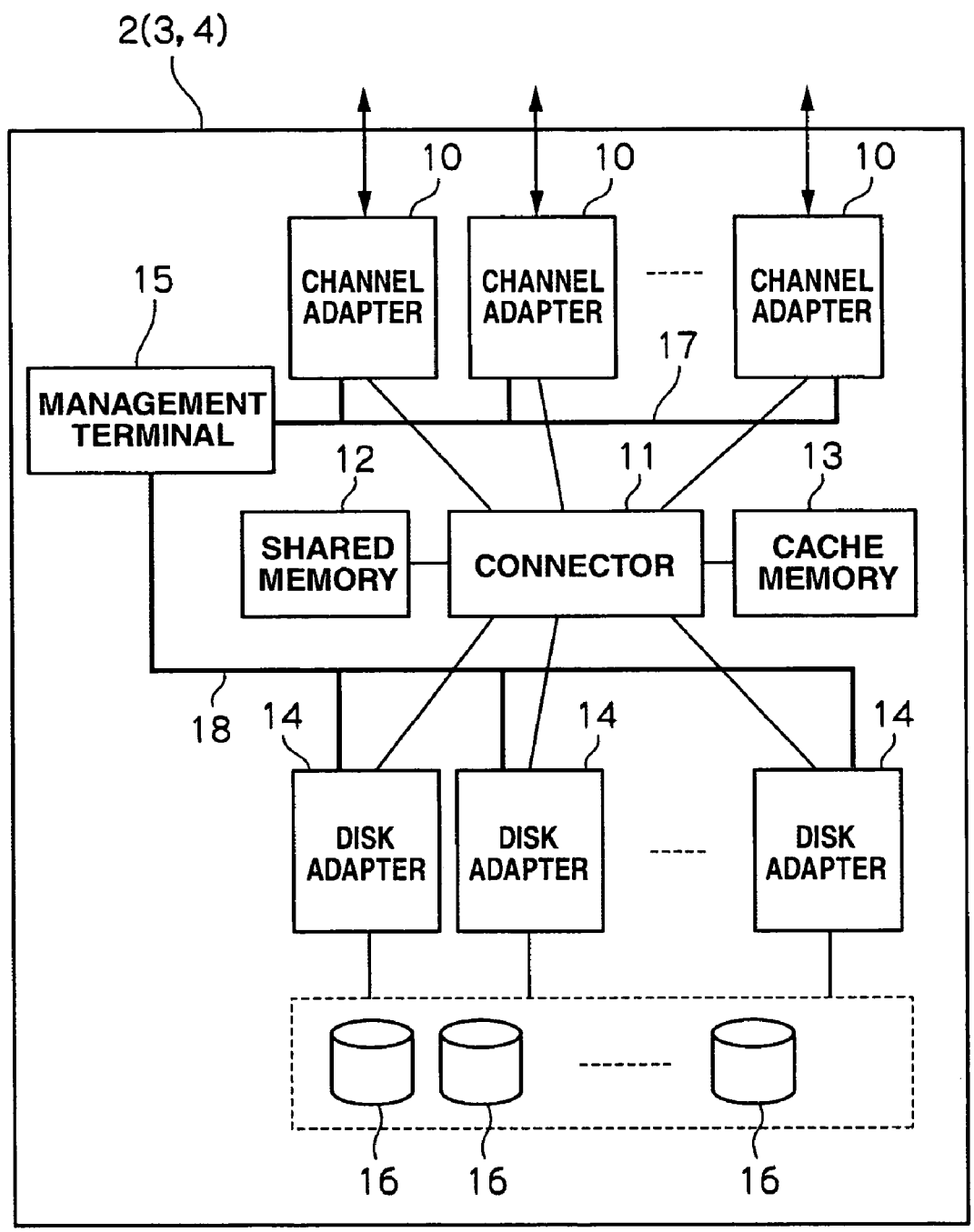
FIG. 2 is a block diagram showing a hardware structure for a first, a second, or a third storage apparatus.

As FIG. 2 shows, each of the first, second, and third storage apparatuses 2, 3, and 4 is composed of: a plurality of channel adapters 10; a connector 11; a shared memory 12; a cache memory 13; a plurality of disk adapters 14; a management terminal 15; and a plurality of disk drives 16. Disk array devices are adopted as the first, second, and third storage apparatuses 2, 3, and 4 in the present embodiment, however, other devices such as semiconductor storage apparatuses may be adopted instead.

Each of the channel adapters 10 are configured as a micro computer system having a micro-processor, a memory, a communication interface, and the like, and serve as an interface between the first, second, or third host computer 5, 6, or 7 (FIG. 1) and the relevant storage apparatus. The channel adapters 10 receive data input/output requests from the first, second, and third host computers 5, 6, and 7 and write them to the cache memory 12. Incidentally, a remote copy function, which will be described later, and various related functions are provided by the micro-processors in the channel adapters 10 executing programs for executing those functions.

The connector 11 is connected to the channel adapters 10, the shared memory 12, the cache memory 13, and the disk adapters 14. Accordingly, transmission of data and commands between the channel adapters 10, the shared memory 12, the cache memory 13, and the disk adapters 14 is conducted via this connector 11. The connector 11 is configured with a bus or a switch such as a very-high-speed crossbar switch that conducts data transmission by high-speed switching.

The shared memory 12 and the cache memory 13 are storage memory shared by the channel adapters 10 and the disk adapters 14. The shared memory 12 is mainly used for storing control information and commands while the cache memory 13 is mainly used for temporarily storing data input/output to/from the disk drives.

The management terminal 15 is a computer for maintaining/managing the entire first, second, or third storage apparatus 2, 3, or 4 and the disk drives 16. It is connected to the channel adapters 10 via a LAN 17 as well as to the disk adapters 14 via a LAN 18. Changes in software executed by the channel adapters 10 and the disk adapters 14, and changes in parameters are made via instructions from the management terminal 15.

Each of the disk adapters 14 is configured as a micro computer system having a micro-processor and memory. They read data input/output requests written to the shared memory 12 by channel adapters 10 and have the disk drives 16 execute processing such as writing or reading of data according to commands (for example, a command adhering to a Small Computer System Interface (SCSI) standard) set for the data input/output requests. After this processing is completed, the disk adapter 14 transmits data write completion notification or data read completion notification to the channel adapter 10. The disk adapter 14 may have the function of controlling the disk drives 16 according to a RAID level (for example, 0, 1, or 5) regulated according to a so-called Redundant Array of Inexpensive Disks (RAID) system.

Each of the disk drives 16 includes, for example, an expensive disk device such as a Small Computer System Interface (SCSI) disk, or an inexpensive disk such as a Serial Advanced Technology Attachment (SATA) disk or an optical disk. The disk devices in the disk drives 16 are used according to a RAID system. One or more disk devices provide physical storage areas, for which one or more logical volumes (hereinafter called the "logical volume(s)") $VOL_D$ (FIG. 3) are set. Data is stored in the logical volume(s) $VOL_D$.

Figure 3:
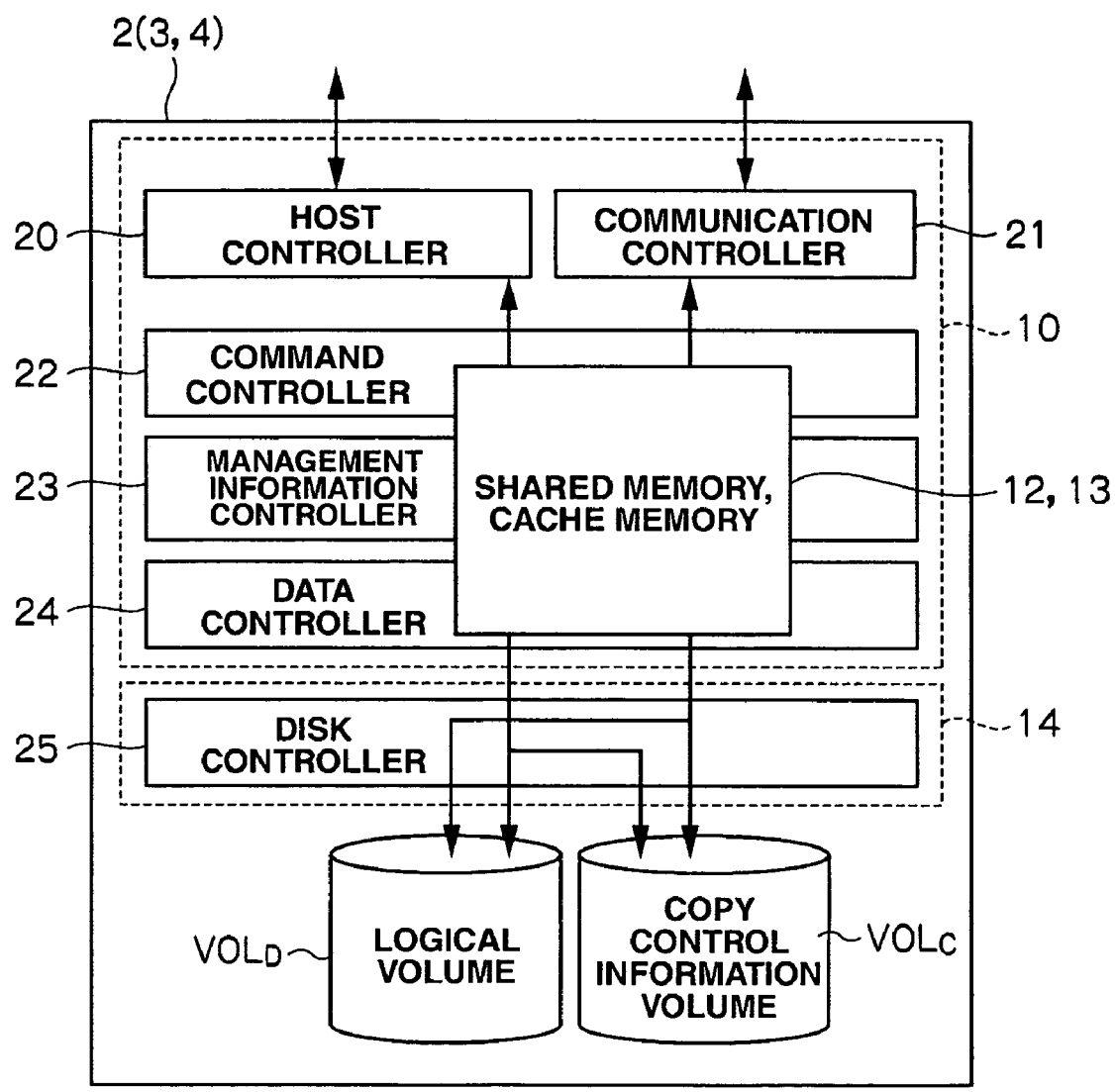
FIG. 3 is a block diagram showing a software structure for the first, second, or third storage apparatus.

FIG. 3 shows a software structure for a channel adapter 10 and a disk adapter 14 in the first, the second, or the third storage apparatus 2, 3, or 4. As mentioned above, a channel adapter 10 is structured as a micro computer system having a micro-processor and a memory. The micro-processor executes a program stored in the memory to implement various processing.

The processing functions of a channel adapter 10 are specifically provided by the following elements in the channel adapter 10: a host controller 20; a communication controller 21; a command controller 22; a management information controller 23; and a data controller 24. The host controller 20 executes various processing as an interface between the relevant storage apparatus 2, 3, or 4 and the host computer 5, 6, or 7. The communication controller 21 is a communication interface for transmitting data to the other storage apparatuses, and is also used to conduct transmission of copy data executed during a remote copy, which will be described later. The command controller 22 generates or interprets various commands transmitted between the relevant storage apparatus 2, 3, or 4 and the host computer 5, 6, or 7. The management information controller 23 executes various remote copy management processing. The data controller 24 executes data read/write processing for the logical volume(s) $VOL_D$ during a remote copy.

Likewise, each disk adapter 14 is structured as a micro computer system having a micro-processor and a memory. The micro-processor executes a program stored in the memory to start up a disk controller 25. The disk controller 25 executes processing such as writing and reading of data to/from the logical volume(s) $VOL_D$ according to data input/output requests written to the shared memory 12 (FIG. 2).

3. Remote Copy

The storage system 1 according to the present embodiment is of the type called a 3 data center (3DC), where a remote copy is conducted between the logical volume(s) $VOL_D$ provided by the first storage apparatus 2 located at the main first site and the logical volume(s) $VOL_D$ provided by the second and third storage apparatuses 3 and 4 located at the backup second and third sites.

When data is written to logical volume(s) $VOL_D$ provided by the copy-from first storage apparatus 2, it is transmitted via the network 8 to the copy-to second and third storage apparatuses 3 and 4 and written to logical volume(s) $VOL_D$ in the second storage apparatus 3 and logical volume(s) $VOL_D$ in the third storage apparatus 4 at positions having the same addresses. Specifically, the remote copy is conducted in such a manner that the content of the main logical volume(s) $VOL_D$ and the corresponding content of the backup logical volume(s) $VOL_D$ match. In the following description, the two storage apparatuses to which the remote copy is conducted are called the storage apparatuses constituting a "pair."

There are two methods by which a remote copy can be conducted: a synchronous method and a non-synchronous method. In the present embodiment, the remote copy between the first storage apparatus 2 and the second storage apparatus 3 is conducted using the synchronous method and the remote copy between the first storage apparatus 2 and the third storage apparatus 4 is conducted using the non-synchronous method.

Normally, with the synchronous method, upon receiving from a host computer a data input/output request instructing a data write to main logical volume(s), a main storage apparatus writes the data to its own logical volume(s). It also transmits that same data to a backup storage apparatus. The backup storage apparatus writes the received data to its own logical volume(s) and notifies the main storage apparatus to that effect. Then, upon receiving that notification, the main storage apparatus transmits to the host computer notification that the data write has been completed (hereinafter called the "completion notification").

As described above, in the synchronous method, the completion notification is transmitted to the host computer after it is confirmed that the data has been written to both the main logical volume(s) and the backup logical volume(s).

Accordingly, by a synchronous remote copy, the match in content between the content of the main logical volume(s) and the content of the backup logical volume(s) is ensured when the host computer receives the completion notification.

However, because the completion notification is not transmitted to the host computer until the data write to the backup logical volume(s) is completed, the synchronous method generally requires a longer response time than the non-synchronous method, the response time being the time elapsed between the host computer's transmission of a data input/output request to the main storage apparatus and its receipt of completion notification.

On the other hand, in the non-synchronous method, having received from a host computer a data input/output request instructing a data write to the main logical volume(s), the main storage apparatus writes the data to its own logical volume(s) in response to the request. Then, it transmits that same data to a backup storage apparatus. The backup storage apparatus writes the received data to its own logical volume(s) and notifies the main storage apparatus to that effect.

Here, when the main storage apparatus writes the data to its own logical volume(s), it immediately transmits completion notification to the host computer regardless of whether or not the data has been written to the backup storage apparatus. Therefore, in the non-synchronous method, the response time to the host computer is shorter than that of the synchronous method. However, the match of data between the main logical volume(s) and the backup logical volume(s) cannot be necessarily ensured. Incidentally, in the non-synchronous method, data that has not been reflected in the backup storage apparatuses is managed by the main storage apparatus.

4. Remote Copy Function of Storage System According to the Present Embodiment

Next, the remote copy function of the storage system 1 will be explained. One of the characteristics of the storage system 1 according to the present embodiment is that, in response to a data check request periodically given from the first storage device 2 located at the main first site, backup data in both the second and the third storage apparatuses 3 and 4 located at the backup second and third sites is compared and the consistency between the second and the third storage apparatuses 3 and 4 is verified.

Figure 4:
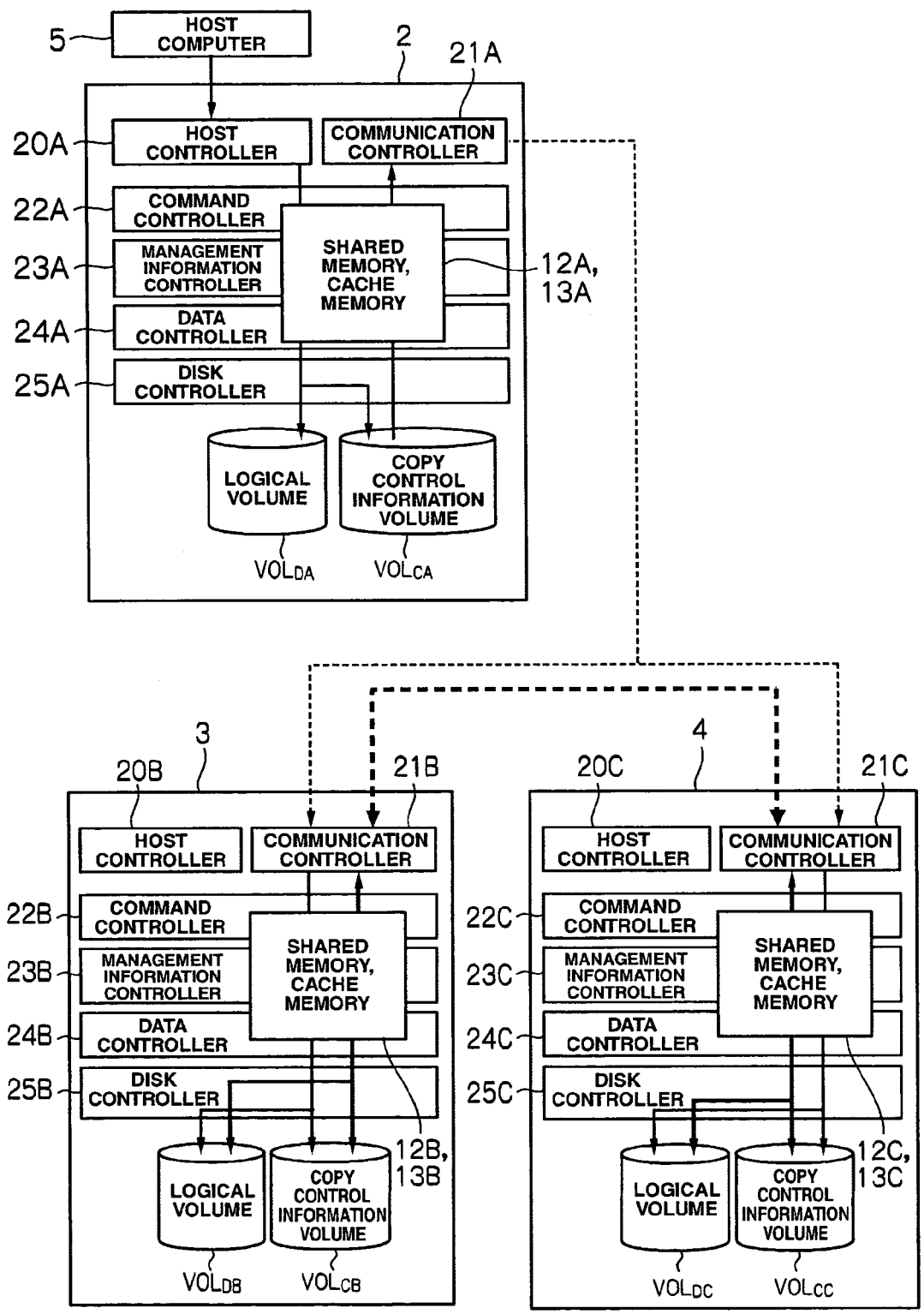
FIG. 4 is a block diagram showing the software structure for the storage system.
Figure 5:
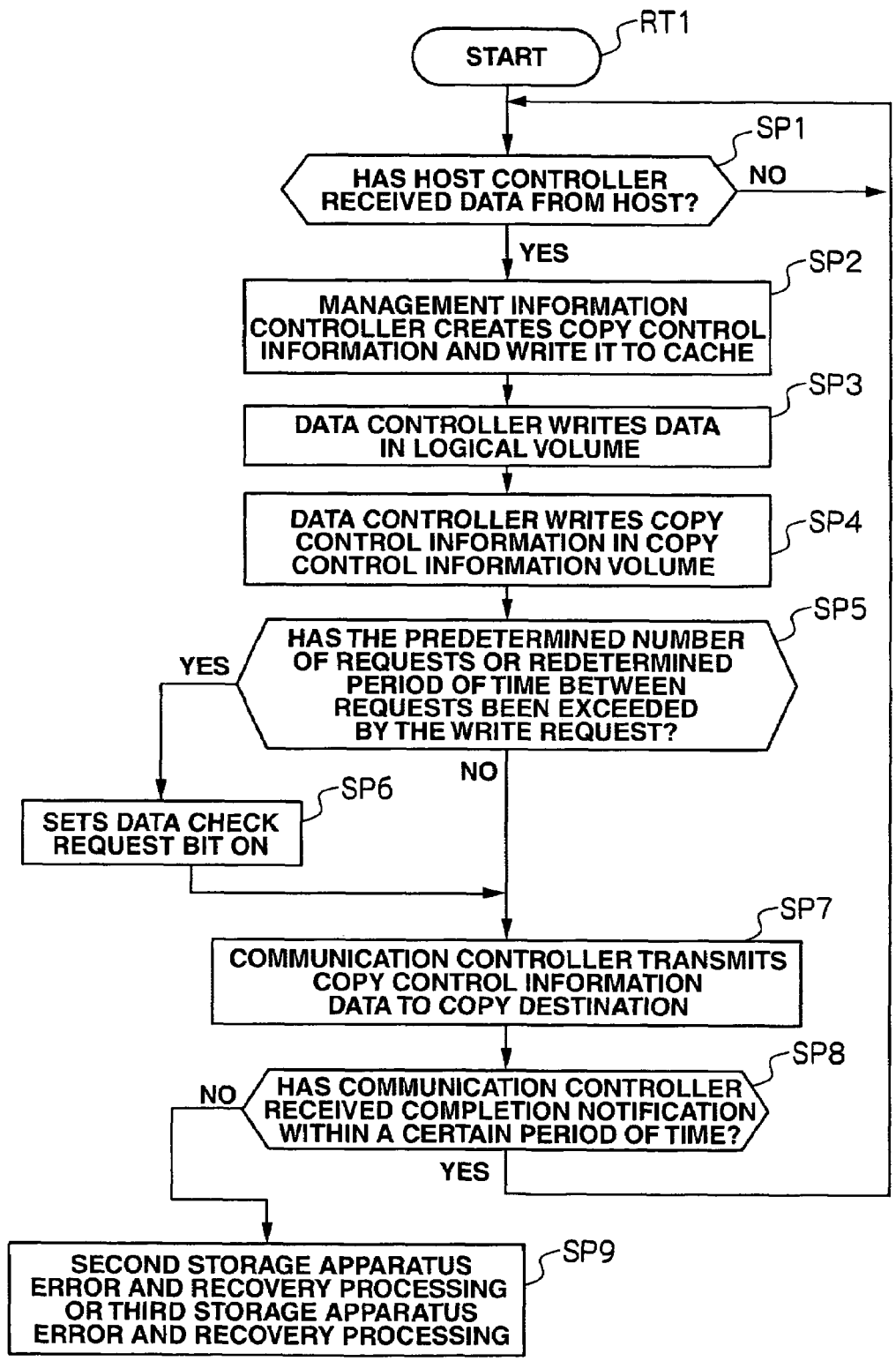
FIG. 5 is a flow chart indicating a primary side backup processing routine.

FIG. 4 shows a software structure for the remote copy function in the storage system 1 related to the remote copy function. FIG. 5 shows a processing routine (hereinafter called the "primary side backup processing routine RT1") executed by the main first storage apparatus 2 with regard to the remote copy function. In FIG. 4, regarding the elements corresponding to those in FIG. 3, those in the first storage apparatus 2 have subscripts "A," those in the second storage apparatus 3 have subscripts "B," and those in the third storage apparatus 4 have subscripts "C."

Figure 6:
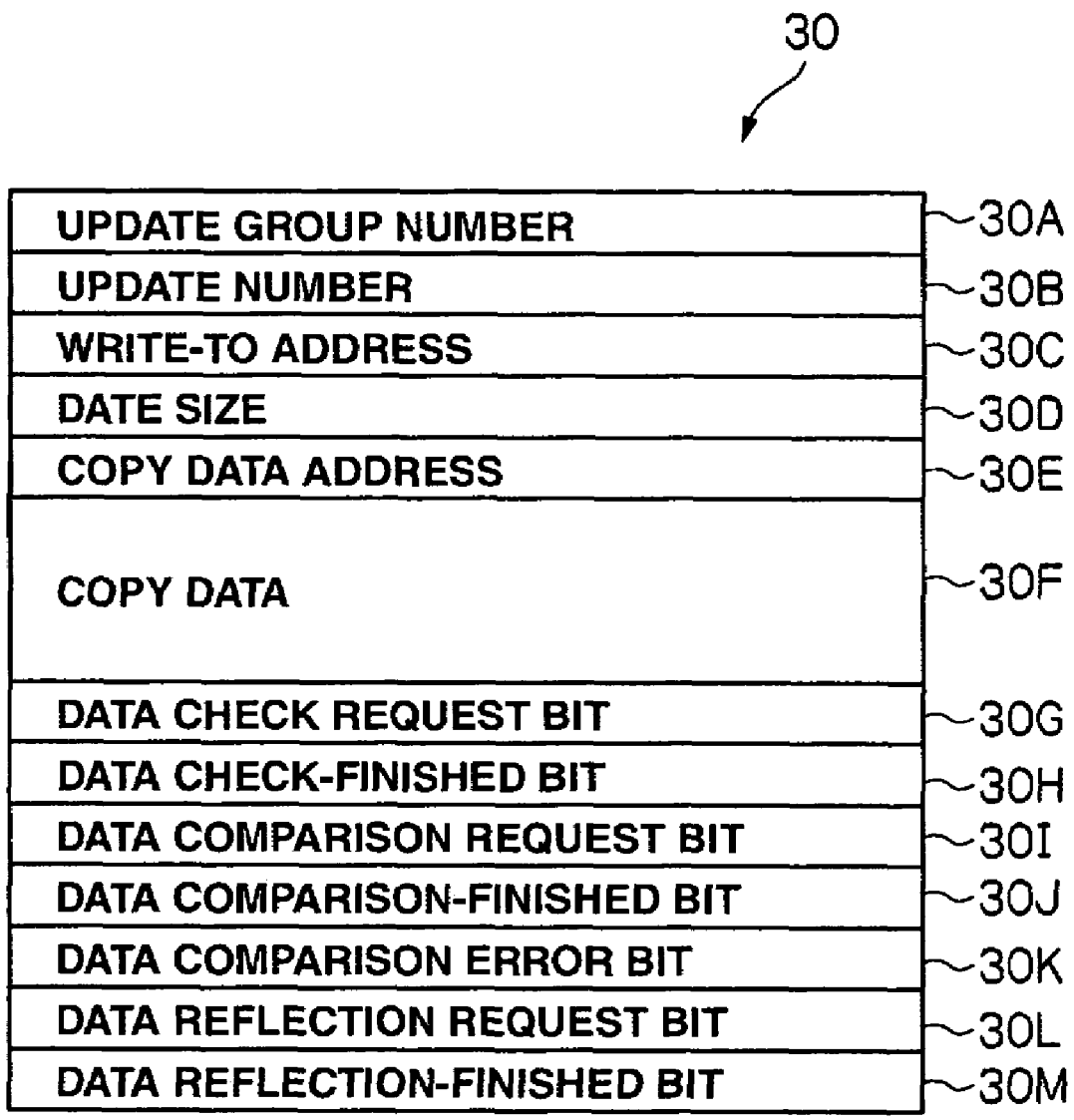
FIG. 6 is a diagram showing a data format for copy control information.

During normal operations, the host controller 20A in the first storage apparatus 2 waits for a data write request from the first host computer 5 (SP1). Then, when the host controller 20A receives a data write request and writes target data from the first host computer 5 (SP1: Yes), the management information controller 23A in the first storage apparatus 2 creates, for the received data, copy control information 30 in the format as shown in FIG. 6 (SP2).

Copy control information 30 is created when remote-copying (that is, backup) data written to main logical volume(s) $VOL_{DA}$ to backup logical volume(s) $VOL_{DB}$ or $VOL_{DC}$, or when comparing and verifying the consistency in backup data between the backup logical volumes $VOL_{DB}$ and $VOL_{DC}$. It consists of: an update group number field 30A; an update number field 30B; a write-to address field 30C; a data size field 30D; a copy data address field 30E; a copy data field 30F; a data check request bit field 30G; a data check-finished bit field 30H; a data comparison request bit field 30I; a data comparison-finished bit field 30J; a data comparison error bit field 30K; a data reflection request bit field 30L; and a data reflection-finished bit field 30M.

Backup target data written to the logical volume(s) $VOL_{DA}$ in the first storage apparatus 2, or comparison/verification target backup data to be compared and consistency-verified between the backup logical volumes $VOLD_{DB}$ and $VOL_{DC}$, is stored in the copy data field 30F.

The identification number of the group to which the backup target data or the comparison/verification target data stored in the copy data field 30F belongs is stored in the update group number field 30A, while a number indicating the rank of the data in the group is stored in the update number field 30B. In a single storage apparatus, a combination of an update group number and an update number is regarded as one value.

Address(es) in the logical volumes $VOL_{DB}$ and $VOL_{DC}$ where the backup target data or the comparison/verification target data should be written or has been written is(are) stored in the write-to address field 30C. Because data is stored at positions having the same addresses in the main logical volume(s) $VOL_{DA}$ and the backup logical volumes $VOL_{DB}$ and $VOL_{DC}$, when executing the backup, for example, address(es) in the main logical volume(s) $VOL_{DA}$ where data included in a data input/output request from the first host computer 5 is to be written, is(are) directly stored in the write-to address field 30C.

The size of the backup target data or the comparison/verification target data is stored in the data size field 30D. The address of the copy data field 30F in the copy control information 30 is stored in the copy data address field 30E.

The fields from the data check request bit field 30G to the data reflection-finished bit field 30M in the copy control information 30 are used for comparing the corresponding backup data and verifying the consistency between the backup second storage apparatus 3 and the backup third storage apparatus 4.

A flag is stored in the data check request bit field 30G when the main first storage apparatus 2 requests the backup second and third storage apparatuses 3 and 4 execute processing to check their backup data, which will be described later. A flag is stored in the data check-finished bit field 30H when the comparison/verification of the backup data stored in the copy data field 30F has been completed.

A flag is stored in the data comparison request bit field 30I when one of the second and the third storage apparatuses 3 and 4 requests the other transfer the comparison/verification target backup data when executing the check processing. A flag is stored in the data comparison-finished field 30J when the comparison/verification of the backup data stored in the copy data field 30F in the copy control information 30 has finished. A flag is stored in the data comparison error bit field 30K when, according to the result of the comparison/verification of the backup data stored in the copy data field 30F, the backup data in the second storage apparatus 3 and that in the third storage apparatus 4 did not match.

A flag is stored in the data reflection request bit field 30L when the first storage apparatus 2 detects any failure in the second or third storage apparatuses 3 or 4, or detects that the link with the second and third storage apparatuses 3 and 4 has been cut. When a flag is stored in this field, recovery processing is conducted for the backup second and third storage apparatuses 3 and 4 to recover the faulty storage apparatus 3 or 4. A flag is stored in the data reflection-finished bit field 30M when the recovery processing has been completed for the second or third storage apparatus 3 or 4 that had received the data reflection request.

Incidentally, in an initialized state, no flag is stored in the data check request bit field 30G, the data check-finished bit field 30H, the data comparison request bit field 30I, the data comparison-finished bit field 30J, the data comparison error bit field 30K, the data reflection request bit field 30L or the data reflection-finished bit field 30M.

Returning to FIG. 5, when data to be written to the logical volume(s) $VOL_{DA}$ is transmitted from the first host computer 5, the management information controller 23A in the first storage apparatus 2 creates, for the data, copy control information 30 where an update group number, an update number, a write-to address, a data size, and data are stored in the update group number field 30A, the update number field 30B, the write-to address field 30C, the data size field 30D, and the copy data field 30F respectively; and stores it in the cache memory 13A (SP2).

Then, the data controller 20A has the logical volume(s) $VOL_{DA}$ in the first storage apparatus 2 write the write target data from the first host computer 5 to itself(themselves) via the disk controller 25A (SP3). Then, the data controller 20A stores the copy control information 30 in the cache memory 13A in logical volume(s) for storing copy control information (hereinafter called the "copy control information volume(s) $VOL_{CA}$") provided separately from the logical volume(s) $VOL_{DA}$ for storing data (SP4).

Subsequently, the management information controller 23A judges whether or not the number of data write requests transmitted from the first host computer 5 exceeds a predetermined number or whether or not a predetermined period of time has elapsed since the last request for verification of backup data consistency (since the last data check request issuance) (SP5). Then, if the judgment is positive (SP5: Yes), the management information controller 23A stores a flag in the data check request bit field 30G in the copy control information 30 so that the second and third storage apparatuses 3 and 4 execute check processing, which will be described later (SP6).

Subsequently, in the first storage apparatus 2, the communication controller 21A transmits the copy control information 30 stored in the cache memory 13A to the second and third storage apparatuses 3 and 4 (SP7). Then, it waits for the aforementioned completion notification to be transmitted from both the second and the third storage apparatuses 3 and 4 (SP8), and when that notification has been received from both the second and third storage apparatuses 3 and 4 within a certain period of time (SP8: Yes), it enters a standby mode in which it waits for the next data write request from the first host computer 5 (SP1).

However, if the communication controller 21A in the first storage apparatus 2 does not receive the completion notification from the second or third storage apparatus 3 or 4 within a certain period of time (SP8: No), it can be considered that a failure has occurred in the second or third storage apparatus 3 or 4 from which the completion notification was not transmitted, or that the link with the second or the third storage apparatus 3 or 4 has been cut. In such a case, second error and recovery processing or third error and recovery processing, which will be described later, is executed in the storage system 1 (SP9).

Figure 7:
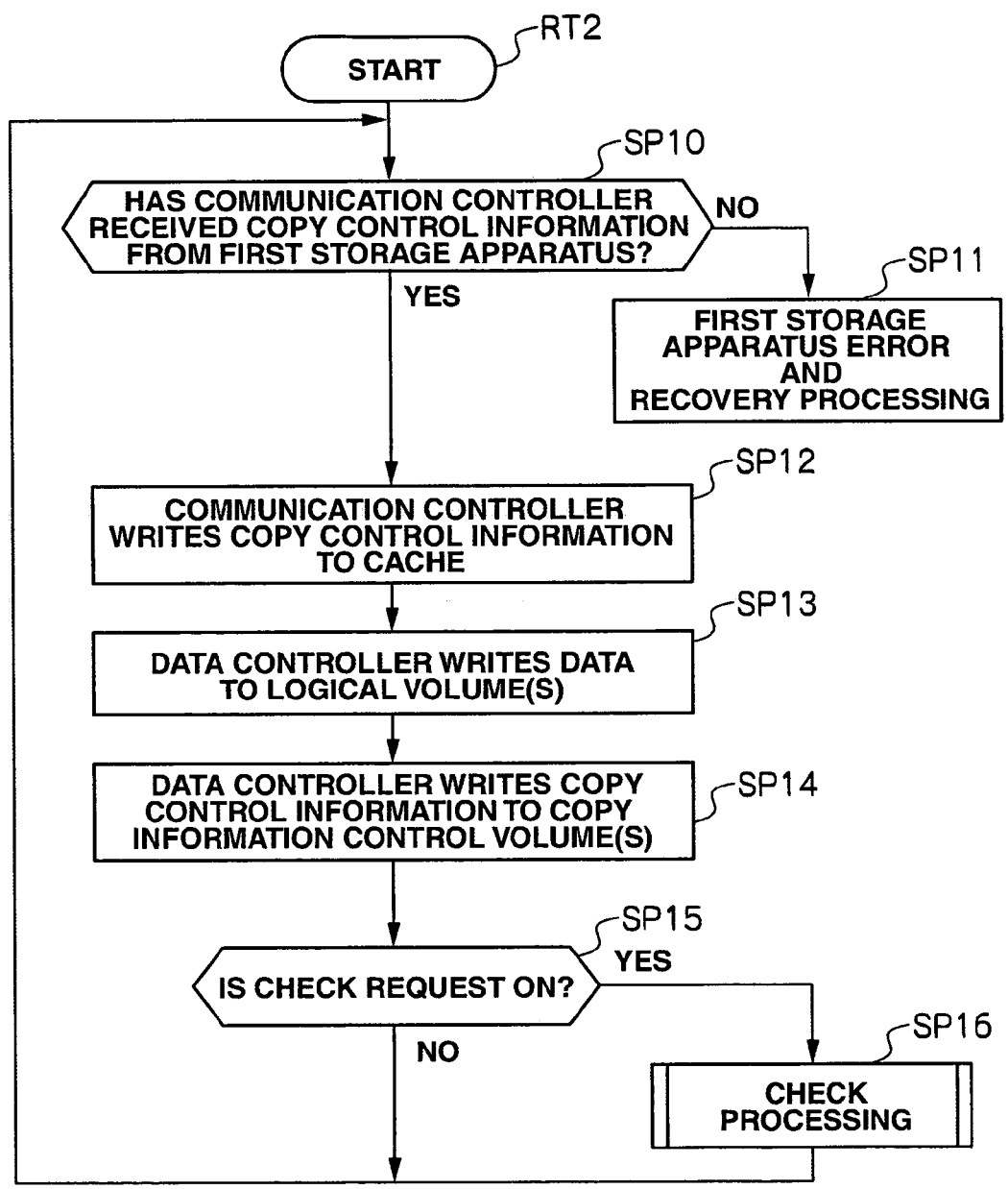
FIG. 7 is a flow chart indicating a secondary side backup processing routine.

On the other hand, FIG. 7 shows a processing routine for the remote copy executed by the second and third storage apparatuses 3 and 4 (hereinafter referred to as the "secondary side backup processing routine RT2). During normal operations, the communication controllers 21B and 21C in the second and the third storage apparatuses 3 and 4 wait for copy control information 30 to be transmitted from the first storage apparatus 2 (SP10).

Here, if the communication controller 21B or 21C in the second or third storage apparatus 3 or 4 does not receive copy control information 30 within a certain period of time (SP10: No), it can be considered that a failure has occurred in the first storage apparatus 2, or that the link between the first storage apparatus 2 and the second storage apparatus 3 or the link between the first storage apparatus 2 and the third storage apparatus 4 has been cut. In such a case, first error and recovery processing, which will be described later, is executed in the storage system 1 (SP11)

On the contrary, if the communication controllers 21B and 21C in the second and third storage apparatuses 3 and 4 receive copy control information 30 from the first storage apparatus 2 within a certain period of time (SP10: Yes), they write it to the cache memories 13B and 13C (SP12). When the copy control information 30 is stored in the cache memories 13B and 13C, the data controllers 24B and 24C in the second and third storage apparatuses 3 and 4 read address(es) stored in the write-to address field 30C in the copy control information 30 and write the data stored in the copy data field 30F in positions having the address(es) via the disk controllers 25B and 25C. Thereby, the same data as that written to the logical volume(s) $VOL_{DA}$ in the first storage apparatus 2 is written to the logical volumes $VOL_{DB}$ and $VOL_{DC}$ in the second and third storage apparatuses 3 and 4, i.e., backup is conducted.

About that time, the data controllers 24B and 24C in the second and the third storage apparatuses 3 and 4 store the copy control information 30 stored in the cache memories 13B and 13C to logical volumes (hereinafter called the "copy control information volume(s) $VOL_{CB}$ and $VOL_{CC}$") separately provided from the logical volumes $VOL_{DB}$ and $VOL_{DC}$ for storing data (SP13). Then, the management information controllers 23B and 23C in the second and third storage apparatuses 3 and 4 judge whether or not a flag is stored in the data check request bit field 30G in the data control information 30 stored in the copy control information volumes $VOL_{CB}$ and $VOL_{CC}$ (SP15).

If there is no flag stored in the data check request bit field 30G (SP15: No), the second and third storage apparatuses 3 and 4 enter a standby mode in which communication controllers 21B and 21C wait for the next copy control information 30 to be transmitted from the first storage apparatus 2 (SP10).

On the contrary, if there is a flag stored in the data check request bit field 30G (SP15: Yes), the second and third storage apparatuses 3 and 4 execute check processing to verify the consistency in the backup data between the second storage apparatus 3 and the third storage apparatus 4. This check processing is conducted for backup data obtained since the last check processing to the present time. Incidentally, during the check processing, the second and third storage apparatuses 3 and 4 temporarily stop reflecting the backup target data in the copy control information 30 transmitted from the first storage apparatus 2 to the logical volumes $VOL_{DB}$ and $VOL_{DC}$, but continue receiving copy control information 30 from the first storage apparatus 2 and accumulating it in the cache memories 13B and 13C. After the completion of the check processing, the second and third storage apparatuses 3 and 4 reflect the copy control information 30 in the logical volumes $VOL_{DB}$ and $VOL_{DC}$ (that is, they write the data stored in the copy data field 30F in the copy control information 30 to the logical volumes $VOL_{DB}$ and $VOL_{DC}$).

Figure 8:
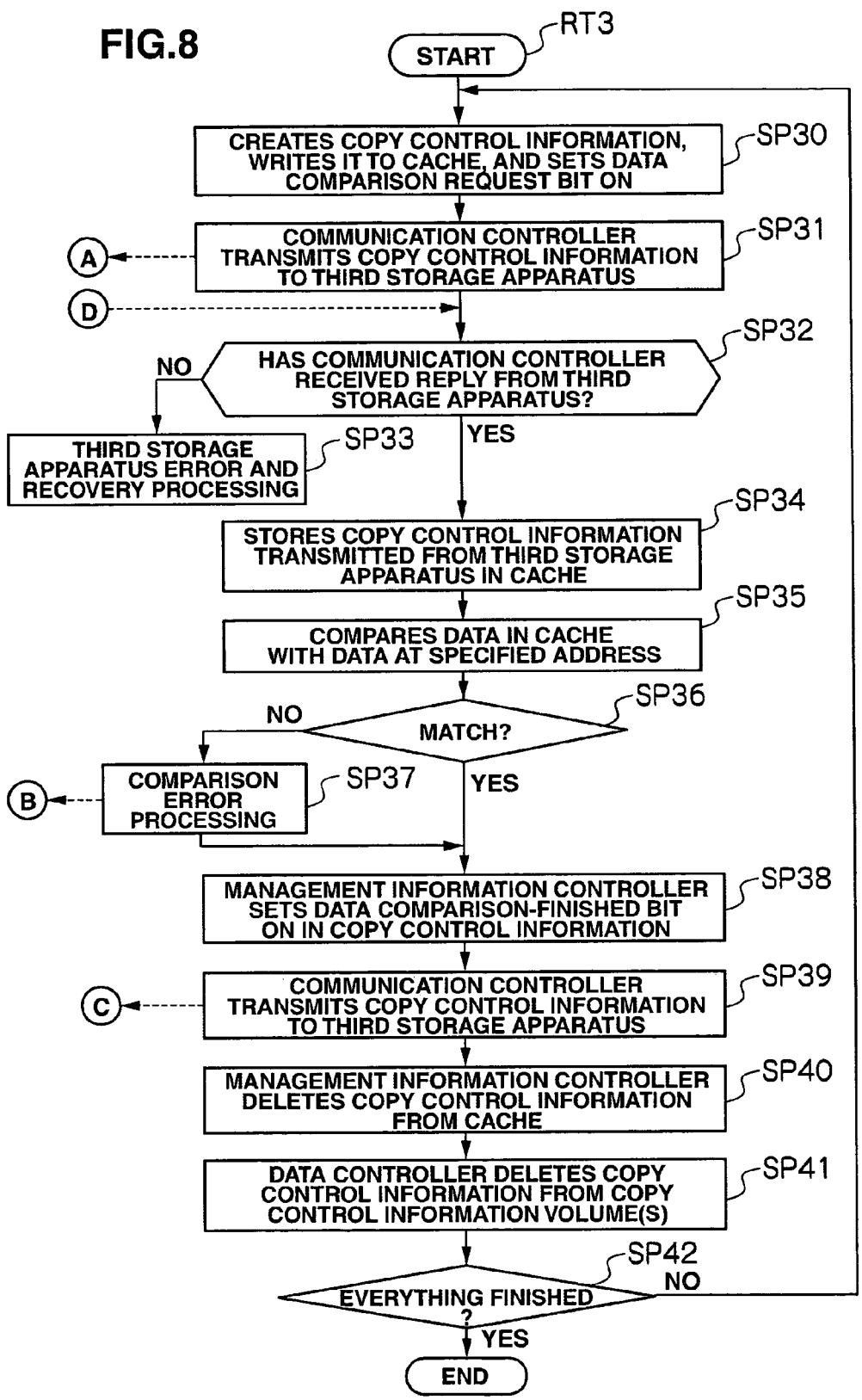
FIG. 8 is a flow chart indicating a leading side check processing routine.

FIG. 8 shows a processing routine (hereinafter called the "leading side check processing routine RT3") for the check processing executed by the second storage apparatus 3 when the second storage apparatus 3 has the initiative in the check processing. FIG. 9 shows a processing routine for the check processing (hereinafter called the "subordinate side check processing routine RT4") executed by the third storage apparatus 4 in the above case.

In the second storage apparatus 3, when the check processing is started, the management information controller 23B first creates copy control information 30, such as the one described above in relation to FIG. 6, for the data stored in the copy data field 30F of the copy control information 30 which had been received for the first time since the end of the last check processing (corresponding to the oldest copy control information 30 stored in the copy control information volume(s) $VOL_{CC}$); and stores it in the cache memory 13B (SP30). The created copy control information 30 has the same data in the update group number field 30A, the update number field 30B, the write-to address field 30C, the data size field 30D and the copy data address 30E as the oldest copy control information 30 stored in the copy control information volume $VOL_{CC}$ does, and a flag is stored in its data comparison request bit field 30I, but it has no data stored in its copy data field 30F.

When this copy control information 30 is stored in the cache memory 13B, the communication controller 21B in the second storage apparatus 3 reads and transmits it to the third storage apparatus 4 (SP31). Then, it waits for the third storage apparatus 4 to store corresponding backup data in the copy data field 30F in the copy control information 30 and send back the copy control information 30 to the communication controller 21B (SP32), as will be described in more detail later.

If the third storage apparatus 4 does not return the copy control information 30 within a certain period of time (SP32: No), it is conceivable that a failure has occurred in the third storage apparatus 4 or that the link between the second storage apparatus 3 and the third storage apparatus 4 has been cut. In such a case, the storage system 1 executes second error and recovery processing (SP33), which will be described later.

On the other hand, if the third storage apparatus 4 returned the copy control information 30 within a certain period of time, the communication controller 21B in the second storage apparatus 3 stores it in its cache memory 13B (SP34). The data controller 24B in the second storage apparatus 3 then controls the disk controller 25B and has the logical volume(s) $VOL_{DB}$ read the backup data corresponding to the one stored in the copy data field 30F in the returned copy control information 30. Then the data controller 24B compares the backup data read out from the logical volume(s) $VOL_{DC}$ in the third storage apparatus 4 and the corresponding backup data read out from the logical volume(s) $VOL_{DB}$ in the second storage apparatus 3 (SP35).

If they do not match (SP36: No), the management information controller 23B in the second storage apparatus 3 executes predetermined comparison error processing (SP37). This comparison error processing is premised on the notion that the backup data remote-copied to the second storage apparatus 3 using the synchronous method is more reliable than the backup data remote-copied to the third storage apparatus 4 using the the non-synchronous method, and it is conducted to overwrite the backup data in the third storage apparatus 4 with the backup data in the second storage apparatus 3. Specifically, the management information controller 23B stores, in the copy data field 30F in the copy control information 30 currently stored in the cache memory 13B, corresponding backup data stored in the logical volume(s) $VOL_{DB}$ in the second storage apparatus 3; stores a flag in the data comparison error bit field 30K; and transmits it to the third storage apparatus 4.

On the other hand, if the backup data read out from the logical volume(s) $VOL_{DB}$ in the second storage apparatus 3 and the corresponding backup data read out from the logical volume(s) $VOL_{DC}$ in the third storage apparatus 4 match (SP36: Yes), the management information controller 23B in the second storage apparatus 3 stores a flag in the data comparison-finished bit field 30J in the copy control information 30 currently stored in the cache memory 13B at that time (SP38). Incidentally, the management information controller 23B also stores a flag in the data comparison-finished bit field 30J (SP38) when the comparison error processing is terminated.

Subsequently, the communication controller 21B in the second storage apparatus 3 transmits the copy control information 30 to the third storage apparatus (SP39). Then, the management information controller 23B in the second storage apparatus 3 deletes the copy control information 30 from its cache memory 13B (SP40). Moreover the data controller 24B in the second storage apparatus 3 deletes the copy control information 30 from the copy control information volume(s) $VOL_{CB}$. In this manner, in the second storage apparatus 3, pieces of copy control information 30 storing backup data for which comparison/verification has been finished are deleted, in order, from the copy control information volume $VOL_{CB}$.

The management information controller 23B in the second storage apparatus 2 judges whether or not the verification has been conducted for all the backup data obtained after the end of the last check processing (whether or not any piece of copy control information 30 is left in the copy control information volume(s) $VOL_{CB}$) (SP42), and if the judgment is negative (SP42: No), it proceeds to the comparison/verification processing for backup data contained in the next copy control information 30 (SP30). If the judgment is positive (SP42: Yes), it completes the series of the check processing steps in the second storage apparatus 3.

On the other hand, in the third storage apparatus 4, when the check processing (FIG. 9) is started, the communication controller 21C waits for data control information 30 from the second storage apparatus 3 (SP50).

If the communication controller 21C in the third storage apparatus 4 does not receive data control information 30 within a certain period of time (SP50: No), it is considered that a failure has occurred in the second storage apparatus 3 or that the link between the second storage apparatus 3 and the third storage apparatus 4 has been cut. In such a case, the storage system 1 executes third error and recovery processing (SP51), which will be described later.

On the other hand, if the communication controller 21C in the third storage apparatus 4 receives data control information 30 within a certain period of time (SP50: Yes), it stores it in its cache memory 13C (SP52). When this copy control information 30 is stored in the cache memory 13C, the data controller 24C in the third storage apparatus 4 reads backup data stored in the logical volume(s) $VOL_{DC}$ at the position having the address stored in the write-to address field 30C in the copy control information 30; and stores the backup data in the copy data field 30F in the copy control information 30 (SP53). Then, the communication controller 21C in the third storage apparatus 4 transmits the copy control information 30 back to the second storage apparatus 3 (SP54).

Then the communication controller 21C in the third storage apparatus 4 waits for the copy control information 30 to be returned with the result of the comparison/verification between the backup data read out from the logical volume(s) $VOL_{DB}$ in the second storage apparatus 3 and that of the logical volume(s) $VOL_{DC}$ in the third storage apparatus 4 stored therein (SP55). This copy control information 30 is that transmitted from the second storage apparatus 3 to the third storage apparatus 4 through the steps SP37 to SP39 in FIG. 8.

Here, also in this case, if the third storage apparatus 4 does not receive the copy control information 30 within a certain period of time (SP55: No), it is conceivable that a failure has occurred in the second storage apparatus 3 or that the link between the second storage apparatus 3 and the third storage apparatus 4 has been cut. Accordingly, also in this case, the storage system 1 executes the third error and recovery processing (SP56), which will be described later.

On the other hand, if the third storage apparatus 4 receives the copy control information 30 within a certain period of time (SP55: Yes), the management information controller 23C in the third storage apparatus 4 checks the comparison error bit field 30K in the copy control information 30 (SP57). If a flag is stored in the field (SP57: Yes), the management information controller 23C has the data controller 24 execute predetermined comparison error processing (SP58). Specifically, the management information controller 23C overwrites logical volume(s) $VOL_{DC}$ having the address stored in the write-to address field 30C in the copy control information 30 with the backup data stored in the copy data field 30F (the backup data stored in the step SP33 in FIG. 8).

If a flag is not stored in the comparison effort bit field 30K in the copy control information 30 (SP57: No), the management information controller 23C in the third storage apparatus 4 deletes the copy control information 30 from the cache memory 13C (SP59). Incidentally, it also deletes the copy control information 30 from the cache memory 13 in the case where the comparison error processing is terminated (SP59). Then, the data controller 24B in the third storage apparatus 4 deletes the copy control information 30 from the copy control information volume(s) $VOL_{CC}$ (SP60).

Subsequently, the management information controller 23C in the third storage apparatus 4 judges whether or not verification has been conducted for all the backup data obtained after the last check processing (whether or not any copy control information 30 is left in the copy control information volume(s) $VOL_{CC}$) (SP61). If the judgment is negative (SP61: No), the management information controller 23C enters a standby mode in which it waits for the next copy control information 30 to be transmitted from the second storage apparatus 3 (SP50). If the judgment is positive (SP61: Yes), it completes the series of check processing steps executed in the third storage apparatus 4.

5. Error and Recovery Processing

Next, error and recovery processing in the storage system 1 will be explained.

5.1 First Error and Recovery Processing

In the storage system 1 according to the present embodiment, in the step SP10 in the secondary side backup processing routine RT2 described above in relation to FIG. 7, if the communication controllers 21B and 21C in the second and the third storage apparatuses 3 and 4 do not establish communication with the first storage apparatus 2 even after a certain period of time (SP10: No), it can be considered that a failure due to a disaster has occurred in the first storage apparatus 2 or that the link between the first storage apparatus 2 and the second storage apparatus 3, as well as the link between the first storage apparatus 2 and the third storage apparatus 4, has been cut.

In such a case, in this storage system 1, the second and the third storage apparatuses 3 and 4 communicate with each other to confirm that the other storage apparatus, 3 or 4, has not received the copy control information 30 from the first storage apparatus 2 either for a certain period of time (check whether there is a communication error or not) and the second storage apparatus 3 subsequently executes processing for setting itself as the main storage apparatus. Accordingly, during subsequent normal operation, data written to logical volume(s) $VOL_{DB}$ in the second storage apparatus 3 is remote-copied using the non-synchronous method to the third storage apparatus 4, thereby, backup data for the logical volume(s) $VOL_{DB}$ in the second storage apparatus 3 is retained in the logical volume(s) $VOL_{DC}$ in the third storage apparatus 4.

If the first storage apparatus 2 is then recovered or its links with the second and the third storage apparatuses 3 and 4 are recovered, when an administrator of the storage system 1 notifies the first, second, and third storage apparatuses 2, 3, and 4 to that effect via an external management apparatus (not shown in the drawings), recovery processing for the storage system 1 is started.

Specifically, all the backup data, stored in the third storage apparatus 4, for the logical volume(s) $VOL_{DB}$ in the second storage apparatus 3 is one by one remote-copied to the logical volume(s) $VOL_{DA}$ in the first storage apparatus 2 using the non-synchronous method. Moreover, together with that remote copy, data written to the second storage apparatus 3 during normal operation, where the second storage apparatus 3 is used as the main storage apparatus and the first and the third storage apparatuses 2 and 4 are used as backup storage apparatuses, is remote-copied to the logical volumes $VOL_{DA}$ and $VOL_{DC}$ in the first and the third storage apparatuses 2 and 4 in the manner explained in relation to FIGS. 5 to 7. At this time, the remote copy between the first and the second storage apparatuses 2 and 3 is conducted using the synchronous method, and that between the second and the third storage apparatuses is conducted using the non-synchronous method.

Then, when the data copy from the third storage apparatus 4 to the first storage apparatus 2 regarding all the data except for that having been remote-copied from the second storage apparatus 3 to the first storage apparatus 2 after the commencement of this recovery processing is finished, the data copy from the third storage apparatus 4 to the first storage apparatus 2 is stopped and normal operations are conducted in the state where the second storage apparatus 3 is the main storage apparatus and the first and the third storage apparatuses 2 and 4 are backup storage apparatuses.

5-2 Second Error and Recovery Processing

On the other hand, in the storage system 1 according to the present embodiment, if the first storage apparatus 2 does not receive completion notification from the second storage apparatus 3 even after a certain period of time in the step SP8 in the primary side backup processing routine RT1 described in relation to FIG. 5, or if the third storage apparatus 4 does not receive copy control information 30 from the second storage apparatus 3 even after a certain period of time in the step SP50 or the step SP55 in the subordinate side check processing routine RT4 described in relation to FIG. 9, it is conceivable that a failure due to a disaster or similar has occurred in the second storage apparatus 3, or that the link between the second storage apparatus 3 and the first storage apparatus 2 or the link between the second storage apparatus 3 and the third storage apparatus 4 has been cut.

Incidentally, the storage system 1 is configured in such a manner that if the second storage apparatus 3 cannot receive copy control information 30 from the third storage apparatus 4 even after a certain period of time in the step SP32 in the processing routine of FIG. 8, or if the third storage apparatus 4 cannot receive copy control information 30 from the second storage apparatus 3 even after a certain period of time in the step SP50 or the step SP55 in the processing routine of FIG. 9, the second or third storage apparatus 3 or 4 waiting for copy control information 30 transmits an error signal to the first storage apparatus 2.

Accordingly, in this storage system 1, if the first storage apparatus 2 receives an error signal from the second or third storage apparatus 3 or 4, it judges that a failure has occurred in the second or third storage apparatus 3 or 4, and if it receives the error signal from both the second and third storage apparatuses 3 and 4, it judges that the link between the second storage apparatus 3 and the third storage apparatus 4 has been cut.

Thereupon, in the storage system 1, it is configured that if the first storage apparatus 2 does not receive completion notification from the second storage apparatus 3 even after a certain period of time in the step SP8 in the primary side backup processing routine RT2 described in relation to FIG. 5, or if an error signal is transmitted from only the third storage apparatus 4 indicating communication inability with the second storage apparatus 3, transmission of copy control information 30 from the first storage apparatus 2 to the second storage apparatus 3 is stopped (that is, backup to the second storage apparatus 3 is stopped) and the remote copy is conducted only between the first storage apparatus 2 and the third storage apparatus 4 using the non-synchronous method (that is, data in the first storage apparatus 2 is backed up only to the third storage apparatus 4).

Then, after the second storage apparatus 3 recovers or the link between the second storage apparatus 3 and the first storage apparatus 2 or the link between the second storage apparatus 3 and the third storage apparatus 4 is recovered, the administrator of the storage system 1 notifies the first, second, and third storage apparatuses 2, 3, and 4 to that effect via the external management device (not shown in the drawings), and the recovery processing is started in the storage system 1.

Specifically, the remote copy from the first storage apparatus 2 to the second storage apparatus 3 using the synchronous method is resumed while a remote-copy of data written to the logical volume(s) $VOL_{DA}$ in the first storage apparatus 2 to the third storage apparatus 4 using the non-synchronous method is continuously conducted in normal operation. Together with that resumption of a remote copy, all the backup data stored in the third storage apparatus 4 for the data in the logical volume(s) $VOL_{DA}$ in the first storage apparatus 2 is remote-copied to the logical volume(s) $VOL_{DB}$ in the second storage apparatus 3 using the non-synchronous method.

Then, when the data copy from the third storage apparatus 4 to the second storage apparatus 3 regarding all the data except for that remote-copied from the first storage apparatus 2 to the second storage apparatus 3 after the commencement of the recovery processing is finished, the data copy from the third storage apparatus 4 to the second storage apparatus 3 is stopped and normal operation is conducted in the state where the first storage apparatus 2 is the main storage apparatus and the second and the third storage apparatuses 3 and 4 are backup storage apparatuses.

5-3 Third Error and Recovery Processing

In the storage system 1 according to the present embodiment, if the first storage apparatus 2 does not receive completion notification from the third storage apparatus 4 even after a certain period of time in the step SP8 in the primary side backup processing routine RT1, or if the second storage apparatus 3 does not receive copy control information 30 from the third storage apparatus 4 even after a certain period of time in the step SP32 in the leading side check processing routine RT3, it is conceivable that a failure has occurred in the third storage apparatus 4 due to a disaster or that the link between the third storage apparatus 4 and the first storage apparatus 2 or the link between the third storage apparatus 4 and the second storage apparatus 3 has been cut.

In this case, in the storage system 1, transmission of copy control information 30 from the first storage apparatus 2 to the third storage apparatus 4 is stopped and the remote copy is conducted only between the first and the second storage apparatuses 2 and 3 using the synchronous method so that the backup data for the data in the logical volume(s) $VOL_{DA}$ in the first storage apparatus 2 is retained only in the second storage apparatus 3.

Then, after the storage apparatus 4 recovers or the link between the second storage apparatus 3 and the third storage apparatus 4 or the link between the first storage apparatus 2 and the third storage apparatus 4 recovers, the administrator of the storage system 1 notifies the first, second, and third storage apparatuses 2, 3, and 4 to that effect via the external management device (not shown in the drawings), and the recovery processing in the storage system 1 is started.

Specifically, the remote copy from the first storage apparatus 2 to the third storage apparatus 4 is resumed using the synchronous method while a remote-copy of data written to the logical volume(s) $VOD_{DA}$ in the first storage apparatus 2 to the second storage apparatus 3 in the synchronous method is continuously conducted in normal operation. Together with that resumption of a remote copy, all the backup data stored in the second storage apparatus 4 for the data in the logical volume(s) $VOL_{DA}$ in the first storage apparatus 2 is remote-copied to the logical volume(s) $VOL_{DC}$ in the third storage apparatus 4 using the non-synchronous method.

Then, when the data copy from the second storage apparatus 3 to the third storage apparatus 4 regarding all the data except for that remote-copied from the first storage apparatus 2 to the second storage apparatus 3 after the commencement of the recovery processing is finished, the data copy from the second storage apparatus 3 to the third storage apparatus 4 is stopped and normal operation is conducted in the state where the first storage apparatus 2 is the main storage apparatus and the second and the third storage apparatuses 3 and 4 are backup storage apparatuses.

6. Effects of the Present Embodiment

With the above configuration of the storage system 1 according to the present embodiment, because verification of the consistency in the backup data stored respectively in the second and the third storage apparatuses 3 and 4 is conducted through communication between the second and the third storage apparatuses 3 and 4, the verification can be conducted without placing any load on the first storage apparatus 2. Accordingly, it is possible to enhance the reliability of the entire system without degrading its performance.

Moreover, because communication can be conducted not only between the first storage apparatus 2 and the second and the third storage apparatuses 3 and 4, but also between the second storage apparatus 3 and the third storage apparatus 4, each of the first, second, and third storage apparatuses 2, 3, and 4 can monitor link failure or trouble in other storage apparatuses and quick reactions can be made when monitoring trouble.

Furthermore, when a failure is detected in any one of the first, second, and third storage apparatuses 2, 3, and 4, recovery processing is conducted using the backup data retained in the backup second and third storage apparatuses 3 and 4; accordingly, data in the faulty storage apparatus 2, 3, or 4 can be recovered without placing load on the main first storage apparatus 2 (or the second storage apparatus 3).

7. OTHER EMBODIMENTS

In the above description of the present embodiment, explanations have been given for a case where the remote copy between the first and the second storage apparatuses 2 and 3 is conducted using the synchronous method, and the remote copy between the first and the third storage apparatuses 2 and 4 is conducted using the non-synchronous method. However, the present invention is not limited to that case and the remote copy between the first and the third storage apparatuses may also be conducted using the synchronous method, or the remote copy between the first and the second storage apparatuses 2 and 3 may be conducted using the non-synchronous method.

For example, where the first and the second storage apparatuses 2 and 3 conduct the remote copy using the non-synchronous method, if the backup data in the second and the third storage apparatuses 3 and 4 does not match on comparison, both the second and the third storage apparatuses 3 and 4 may request the first storage apparatus 2 transfer the data corresponding to their backup data; and overwrite their backup data with the data transmitted from the fist storage apparatus 2 in response to the request; and retain the data therein.

Here, it is also possible to set things so that the second and the third storage apparatuses 3 and 4 do not both request the first storage apparatus 2 transfer the data, but that only one of the second and the third storage apparatuses 3 and 4 requests it; and the data transmitted from the first storage apparatus 2 to the requesting storage apparatus in response to the request is transmitted to the other storage apparatus. With this configuration, it is possible to reduce the backup data-ensuring loads on the first storage apparatus 2.

Moreover, the above embodiment has been described only for the case where the present invention is applied to a 3DC system; however, the present invention is not limited to that case and can be applied to storage systems having three or more storage apparatuses for storing backup data. In such cases, a pair of storage apparatuses verifying the backup data may be determined in advance, or it is possible to make pair settings in accordance with a program previously provided to the main storage apparatus.

Furthermore, the above embodiment has been explained for the case where, as a trigger for having the second and the third storage apparatuses 3 and 4 execute data verification, a flag is stored in the data check request bit frame field 30G in both copy control information 30 transmitted from the first storage apparatus 2 to the second storage apparatus 3, and the copy control information 30 from the first storage apparatus 2 to the third storage apparatus 4. However, the present invention is not limited to that case and a flag may be stored in the data check request bit frame field 30G in the copy control information 30 transmitted to only one of the second and the third storage apparatuses 3 and 4 so that the storage apparatus 3 or 4 that received the copy control information 30 will have the initiative in verifying the consistency in the backup data.

The present invention can be widely applied to various forms of storage systems in addition to the 3DC system.

We claim:

1. A storage system comprising:
a first storage apparatus located at a first site;
a second storage apparatus located at a second site;
a third storage apparatus located at a third site; and
a network connecting the first, second, and third storage apparatuses to one another in a communication-enabling manner,
wherein, the first storage apparatus stores data transmitted from a host system and transmits the data to the second and the third storage apparatuses, and the first storage apparatus transmits a verification request command upon the first storage apparatus' determination that a predetermined number of storage system access requests has occurred or a predetermined time has been exceeded, the first storage apparatus transmitting the verification request command to at least one of the second and the third storage apparatuses to instruct that a data consistency verification be conducted between the second and the third storage apparatuses; and
wherein the second and the third storage apparatuses individually store the data transmitted from the first storage apparatus, and
wherein at least one of the second and the third storage apparatuses are adapted to perform consistency verification operations responsive to the verification request command issued from the first storage apparatus, to verify the consistency in the data between the second and third storage apparatuses, wherein the first storage apparatus does not perform any of the consistency verification operations to verify the consistency in the data between the second and third storage apparatuses.

2. The storage system according to claim 1, wherein:
the first storage apparatus transmits the verification request command to at least one of the second and the third storage apparatuses at a predetermined timing; and
in response to this verification request command, the second and the third storage apparatuses verify the consistency in the data between the second and third storage apparatuses at a timing related to the predetermined timing.

3. The storage system according to claim 2, wherein the predetermined time concerns an elapsed time from the last transmission of the verification request command.

4. The storage system according to claim 1, wherein:
transmission of the data from the first storage apparatus to the second storage apparatus is conducted using a synchronous method;
transmission of the data from the first storage apparatus to the third storage apparatus is conducted using a synchronous method; and
upon the data consistency verification instructed by the verification request command, if the data stored in the second storage apparatus and the data stored in the third storage apparatus do not match, the data stored in the third storage apparatus is overwritten with the corresponding data stored in the second storage apparatus.

5. The storage system according to claim 1, wherein the first storage apparatus judges whether or not a failure has occurred in the second storage apparatus or the third storage apparatus, or whether or not a communication link between the second and the third storage apparatuses has been cut, on a basis of an existence or non-existence of an error in communication between the second storage apparatus and the third storage apparatus.

6. The storage system according to claim 1, wherein:
when a failure occurs in a faulty one of the second storage apparatus and the third storage apparatus, data in a nonfaulty one of the second storage apparatus and third storage apparatus is transmitted to the faulty storage apparatus after recovery of the faulty storage apparatus; and
the faulty storage apparatus is recovered by storing the data transmitted from the other storage apparatus.

7. A backup method for a storage system including: a first storage apparatus located at a first site; a second storage apparatus located at a second site; a third storage apparatus located at a third site, and a network connecting the first, second, and third storage apparatuses to one another in a communication-enabling manner, the method comprising:
the first storage apparatus storing data transmitted from a host system and also transmitting the data to the second storage apparatus and the third storage apparatus, and the first storage apparatus transmitting a verification request command issued by the first storage apparatus upon the first storage apparatus' determination that a predetermined number of storage system access requests has occurred or a predetermined time has been exceeded, the first storage apparatus transmitting the verification request command to at least one of the second and the third storage apparatuses to instruct that a data consistency verification be conducted between the second and the third storage apparatuses;
the second storage apparatus and the third storage apparatus storing, individually, the data transmitted from the first storage apparatus, and
at least one of the second and the third storage apparatuses performing consistency verification operations for verifying a consistency in the data between the second and third storage apparatuses responsive to the verification request command issued from the first storage apparatus, wherein the first storage apparatus does not perform any of the consistency verification operations to verify the consistency in the data between the second and third storage apparatuses.

8. The backup method according to claim 7, comprising:
the first storage apparatus transmitting the verification request command to at least one of the second storage apparatus and the third storage apparatus at a predetermined timing; and
in response to this verification request command, the second storage apparatus and the third storage apparatus verifying the consistency in the data between the second and third storage apparatuses at a timing related to the predetermined timing.

9. The backup method according to claim 8, wherein the predetermined time concerns an elapsed time from a last transmission of the verification request command.

10. The backup method according to claim 7, wherein:
transmission of the data from the first storage apparatus to the second storage apparatus is conducted using a synchronous method, and transmission of the data from the first storage apparatus to the third storage apparatus is conducted using a synchronous method; and
upon the data consistency verification instructed by the verification request command, if the data stored in the second storage apparatus and the data stored in the third storage apparatus do not match, the data in the third storage apparatus is overwritten with the corresponding data stored in the second storage apparatus.

11. The backup method according to claim 7, comprising the first storage apparatus judging whether or not a failure has occurred in the second storage apparatus or the third storage apparatus, or whether or not a communication link between the second storage apparatus and the third storage apparatus has been cut on a basis of an existence or non-existence of an error in communication between the second storage apparatus and the third storage apparatus.

12. The backup method according to claim 7, wherein:
if a failure occurs in a faulty one of the second storage apparatus and the third storage apparatus, data in a non-faulty one of the second storage apparatus and the third storage apparatus is transmitted to the faulty storage apparatus after recovery of the faulty storage apparatus; and
the faulty storage apparatus is recovered by storing the data transmitted from the other storage apparatus.

13. A storage system comprising:
a first storage apparatus located at a first site;
a second storage apparatus located at a second site;
a third storage apparatus located at a third site; and
a network connecting the first, second, and third storage apparatuses to one another in a communication-enabling manner,
wherein, the first storage apparatus stores data transmitted from a host system and transmits the data to the second and the third storage apparatuses, and the first storage apparatus transmits a data-comparison verification request command upon the first storage apparatus' determination that a predetermined number of storage system access requests has occurred or a predetermined time has been exceeded, the first storage apparatus transmitting the data-comparison verification request command to at least one of the second and the third storage apparatuses to instruct that a data-comparison consistency verification be conducted between the data stored in the second and the third storage apparatuses; and
wherein the second and the third storage apparatuses individually store the data transmitted from the first storage apparatus, and
wherein at least one of the second and the third storage apparatuses are adapted to perform data-comparison consistency verification operations responsive to the data-comparison verification request command issued from the first storage apparatus, to compare and verify the consistency in the data between the second and third storage apparatuses, wherein the first storage apparatus does not perform any of the data-comparison consistency verification operations to compare and verify the consistency in the data between the second and third storage apparatuses.

14. The storage system according to claim 13, wherein:
transmission of the data from the first storage apparatus to the second storage apparatus is conducted using a synchronous method;
transmission of the data from the first storage apparatus to the third storage apparatus is conducted using a synchronous method; and
upon the data-comparison consistency verification instructed by the data-comparison verification request command, if the data stored in the second storage apparatus and the data stored in the third storage apparatus do not match upon comparison, the data stored in the third storage apparatus is overwritten with the corresponding data stored in the second storage apparatus.

15. The storage system according to claim 13, wherein the first storage apparatus judges whether or not a failure has occurred in the second storage apparatus or the third storage apparatus, or whether or not a communication link between the second and the third storage apparatuses has been cut, on a basis of an existence or non-existence of an error in communication between the second storage apparatus and the third storage apparatus.

16. The storage system according to claim 13, wherein:
when a failure occurs in a faulty one of the second storage apparatus and the third storage apparatus, data in a non-faulty one of the second storage apparatus and third storage apparatus is transmitted to the faulty storage apparatus after recovery of the faulty storage apparatus; and
the faulty storage apparatus is recovered by storing the data transmitted from the other storage apparatus.

17. A backup method for a storage system including: a first storage apparatus located at a first site; a second storage apparatus located at a second site; a third storage apparatus located at a third site, and a network connecting the first, second, and third storage apparatuses to one another in a communication-enabling manner, the method comprising:
the first storage apparatus storing data transmitted from a host system and also transmitting the data to the second storage apparatus and the third storage apparatus, and the first storage apparatus transmitting a data-comparison verification request command issued by the first storage apparatus upon the first storage apparatus' determination that a predetermined number of storage system access requests has occurred or a predetermined time has been exceeded, the first storage apparatus transmitting the data-comparison verification request command to at least one of the second and the third storage apparatuses to instruct that a data-comparison consistency verification be conducted between the data stored in the second and the third storage apparatuses;
the second storage apparatus and the third storage apparatus storing, individually, the data transmitted from the first storage apparatus, and
at least one of the second and the third storage apparatuses performing data-comparison consistency verification operations for comparing and verifying a consistency in the data between the second and third storage apparatuses responsive to the data-comparison verification request command issued from the first storage apparatus, wherein the first storage apparatus does not perform any of the data-comparison consistency verification operations to compare and verify the consistency in the data between the second and third storage apparatuses.

18. The backup method according to claim 17, wherein:
transmission of the data from the first storage apparatus to the second storage apparatus is conducted using a synchronous method, and transmission of the data from the first storage apparatus to the third storage apparatus is conducted using a synchronous method; and
upon the data-comparison consistency verification instructed by the data-comparison verification request command, if the data stored in the second storage apparatus and the data stored in the third storage apparatus do not match upon comparison, the data in the third storage apparatus is overwritten with the corresponding data stored in the second storage apparatus.

19. The backup method according to claim 17, comprising the first storage apparatus judging whether or not a failure has occurred in the second storage apparatus or the third storage apparatus, or whether or not a communication link between the second storage apparatus and the third storage apparatus has been cut on a basis of an existence or non-existence of an error in communication between the second storage apparatus and the third storage apparatus.

20. The backup method according to claim 17, wherein:
if a failure occurs in a faulty one of the second storage apparatus and the third storage apparatus, data in a non-faulty one of the second storage apparatus and the third storage apparatus is transmitted to the faulty storage apparatus after recovery of the faulty storage apparatus; and the faulty storage apparatus is recovered by storing the data transmitted from the other storage apparatus.

* * * * *